(12) United States Patent
Part

(10) Patent No.: US 12,188,305 B2
(45) Date of Patent: *Jan. 7, 2025

(54) CABLE CONNECTORS FOR USE DOWNHOLE

(71) Applicant: Darren Part, St. Albert (CA)

(72) Inventor: Darren Part, St. Albert (CA)

(73) Assignee: Oilfield Equipment Development Center Limited, Victoria (SC)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,880

(22) Filed: Oct. 2, 2023

(65) Prior Publication Data

US 2024/0026742 A1 Jan. 25, 2024

Related U.S. Application Data

(63) Continuation of application No. 17/407,952, filed on Aug. 20, 2021, now Pat. No. 11,773,657.

(60) Provisional application No. 63/068,487, filed on Aug. 21, 2020.

(51) Int. Cl.
| | |
|---|---|
| *E21B 17/02* | (2006.01) |
| *H01B 7/282* | (2006.01) |
| *H01B 9/00* | (2006.01) |
| *H02G 15/04* | (2006.01) |
| *E21B 43/12* | (2006.01) |

(52) U.S. Cl.
CPC ........ *E21B 17/0285* (2020.05); *E21B 17/023* (2013.01); *E21B 17/026* (2013.01); *H01B 7/282* (2013.01); *H01B 9/00* (2013.01); *H02G 15/04* (2013.01); *E21B 43/128* (2013.01)

(58) Field of Classification Search
CPC .. E21B 17/0285; E21B 17/023; E21B 17/026; E21B 43/128; H01B 7/282; H01B 9/00; H02G 15/04
See application file for complete search history.

(56) References Cited

U.S. PATENT DOCUMENTS

| | | | | |
|---|---|---|---|---|
| 5,917,153 | A * | 6/1999 | Geroldinger | H02G 15/04 174/89 |
| 11,773,657 | B2 * | 10/2023 | Part | H01R 13/533 166/66.4 |
| 2002/0013093 | A1 * | 1/2002 | Wilbourn | H01R 13/523 439/625 |
| 2010/0167582 | A1 * | 7/2010 | Watson | H01R 13/5216 439/589 |
| 2012/0318494 | A1 * | 12/2012 | Michaud | H01R 13/585 166/85.1 |

* cited by examiner

*Primary Examiner* — D. Andrews
(74) *Attorney, Agent, or Firm* — Elliott Law PLLC; Dougal H. Elliott; Nathan Q. Huynh

(57) ABSTRACT

A cable system for use downhole includes a connector assembly having a body and a bore formed therethrough; a conductor disposed through the bore of the connector assembly; and a first insulation layer disposed around the conductor. An insulator tube is disposed around the conductor and has an end attached to the first insulation layer. The insulator tube may be made of a thermoplastic material. A graphite containing sealing member is disposed in the bore and disposed between the insulator tube and the body of the connector assembly.

21 Claims, 2 Drawing Sheets

CABLE CONNECTORS FOR USE DOWNHOLE

CROSS REFERENCE TO RELATED APPLICATIONS

This application is a continuation of and claims benefit to U.S. Nonprovisional application Ser. No. 17/407,952, filed on Aug. 20, 2021, now U.S. Pat. No. 11,773,657, which claims benefit to U.S. Provisional Application 63/068,487, filed on Aug. 21, 2020; and this application hereby incorporates herein U.S. Nonprovisional application Ser. No. 17/407,952 and U.S. Provisional Application 63/068,487, and all amendments thereto as if set forth herein in their entireties.

BACKGROUND

1. Field of Inventions

Certain aspects of the present disclosure generally relate to a power cable for use downhole. In one embodiment, the power cable is used in a high temperature environment to transmit power to a downhole tool. In particular, aspects of the present disclosure relate to cable connectors for use in a high temperature environment to transmit power to a downhole tool.

2. Description of Related Art

Many wells use an artificial lift or pumping system to produce wellbore fluids deep within the earth to surface. One such type of artificial lift system is referred to as an Electric Submersible Pump ("ESP"). An ESP system typically includes the following downhole components: a multi-stage centrifugal pump, an electric motor, and a main power cable for sending electric power downhole to the motor.

A motor lead extension ("MLE") is spliced into the main cable for supplying power to the motor. The end of the MLE has a connector assembly typically referred to as a pothead. The pothead contains the terminals that plug into the motor, which is analogous to an extension cord plugging into a wall socket, to complete the transfer of electric power to the motor. In addition to providing an electrical connection to the motor, the pothead is typically designed to prevent any wellbore fluids from entering the motor and to prevent the motor's high dielectric mineral oil, used to lubricate and insulate the motor, from leaking out.

One of the most challenging types of oil well applications is known as Steam Assisted Gravity Drainage ("SAGD"). The main reason this application is difficult when compared to other more conventional applications is the high temperatures at which the SAGD wells operate. Most conventional wells do not exceed 110° C. However, in SAGD wells, bottom hole temperatures ("BHT") can range from 180° C. to as high as 260° C. When an ESP is installed to produce fluids from the well, the equipment's operating temperatures can be as much as 50° C. higher than the BHT. Thus, an ESP system in a SAGD well may have to operate at 300° C. or above. At these significantly higher temperatures, standard ESP equipment will not function for run times that are economical to the operators of these wells.

Standard ESP equipment may have shortened run lives due to the temperature rating of the insulation systems contained within the motor and MLE. For example, the pothead of a conventional ESP system commonly uses an elastomeric compound to seal the outside surfaces of the three insulated conductors. However, at the expected operating temperatures of a SAGD well, the standard polyimide insulation is not suitable. There is a need, therefore, for new, unique designs to overcome the temperature limitations of standard ESP equipment.

Various cable connectors and methods for connecting electrical cables have been proposed and utilized, including those disclosed in some of the patents and/or publications on the front of this patent. However, those methods and assemblies lack the combination of steps and/or features of the methods and/or assemblies disclosed herein. Furthermore, it is contemplated that the methods and/or assemblies disclosed herein solve many of the problems that prior art methods and assemblies have failed to solve.

SUMMARY

In one embodiment, a cable system for use downhole includes a connector assembly having a body and a bore formed therethrough; a conductor disposed through the bore of the connector assembly; a first insulation layer disposed around the conductor; an insulator tube disposed around the conductor and having an end attached to the first insulation layer, the insulator tube comprising a thermoplastic material; and a graphite containing sealing member disposed in the bore and disposed between the insulator tube and the body of the connector assembly.

In another embodiment, a submersible pumping system for use downhole includes a motor; a pump powered by the motor; a tubing connected to the pump; and a cable disposed along the tubing and configured to provide power to the motor. In one embodiment, the cable includes a connector assembly having a body and a bore formed therethrough; a conductor disposed through the bore of the connector assembly; a first insulation layer disposed around the conductor; an insulator tube disposed around the conductor and having an end attached to the first insulation layer, the insulator tube comprising a thermoplastic material; and a graphite containing sealing member disposed in the bore and disposed between the insulator tube and the body of the connector assembly.

DETAILED DESCRIPTION

1. Introduction

Figure 1:
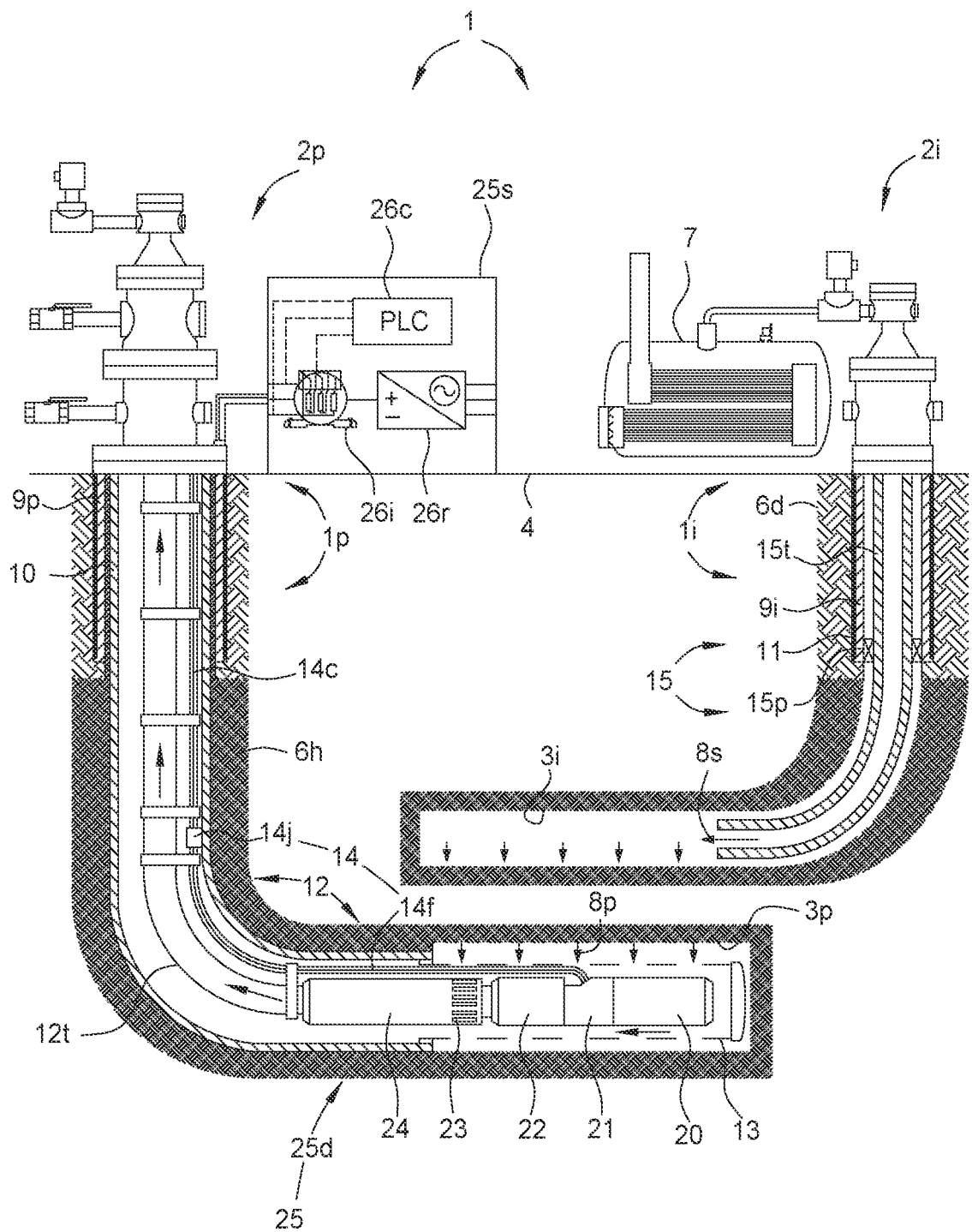
FIG. 1 illustrates an example artificial lift system, according to aspects of the present disclosure.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. To the extent a term used in a claim is not defined below or in representations to the Patent and Trademark Office (PTO), it should be given the broadest definition persons having skill in the art have given that term as reflected in at least one printed publication, dictionary, or issued patent.

2. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

FIG. 1 illustrates an artificial lift system (ALS) 25 pumping production fluid, such as bitumen 8p (also known as tar sand or oil sand), from a steam assisted gravity drainage (SAGD) well 1, according to one embodiment of the present disclosure. Alternatively, the production fluid may be heavy crude oil or oil shale. The ALS 25 may include a motor driver 25s, a power cable 14, and a downhole assembly 25d. The SAGD well 1 may include an injection well 1i and a production well 1p. Each well 1i,p may include a wellhead 2i,p located adjacent to a surface 4 of the earth and a wellbore 3i,p extending from the respective wellhead. Each wellbore 3i,p may extend from the surface 4 vertically through a non-productive formation 6d and horizontally through a hydrocarbon-bearing formation 6h (aka reservoir). Alternatively, the horizontal portions of either or both wellbores 3i,p may be other deviations besides horizontal. Alternatively, the injection well 1i may be omitted and the ALS 25 may be used to pump production fluid from other types of adverse production wells, such as high temperature wells.

Surface casings 9i,p may extend from respective wellheads 2i,p into respective wellbores 3i,p and each casing may be sealed therein with cement 11. The production well 1p may further include an intermediate casing 10 extending from the production wellhead 2p and into the production wellbore 3p and sealed therein with cement 11. The injection well 1i may further include an injection string 15 having an injection tubing string 15t extending from the injection wellhead 2i and into the injection wellbore 3i and having a packer 15p for sealing an annulus thereof.

A steam generator 7 may be connected to the injection wellhead 2i and may inject steam 8s into the injection wellbore 3i via the injection tubing string 15t. The injection wellbore 3i may deliver the steam 8s into the reservoir 6h to heat the bitumen 8p into a flowing condition as the added heat reduces viscosity thereof. The horizontal portion of the production wellbore 3p may be located below the horizontal portion of the injection wellbore 3i to receive the bitumen drainage 8p from the reservoir 6h.

A production string 12 may extend from the production wellhead 2p and into the production wellbore 3p. The production string 12 may include a string of production tubing 12t and the downhole assembly 25d connected to a bottom of the production tubing. A slotted liner 13 may be hung from a bottom of the intermediate casing 10 and extend into an open hole portion of the production wellbore 3p. The downhole assembly 25d may extend into the slotted liner 13. Alternatively, the downhole assembly 25d may extend to a bottom of the intermediate casing 10 or be disposed in the vertical portion of the production wellbore 3p.

The downhole assembly 25d may include a submersible electric motor 20, a motor head 21, a motor seal 22, and a pump 24. Housings of the components may be connected and sealed, such as by flanged connections. The flanged connections may longitudinally and torsionally connect the component housings. Shafts of the components may be torsionally connected, such as by shaft couplings. The shaft couplings may be splined couplings. The shaft couplings may also transfer thrust loading from the pump 24 to the motor seal 22.

The pump 24 may be centrifugal, such as a radial flow or mixed axial/radial flow centrifugal pump. The pump 24 may include one or more stages. Each stage may include an impeller and a diffuser. Each impeller may be longitudinally and torsionally connected to the pump shaft and each diffuser may be longitudinally and torsionally connected to the pump housing. Rotation of each impeller by the pump shaft may impart velocity to the bitumen 8p and flow through the stationary diffuser, which may convert a portion of the velocity into pressure. The pump 24 may deliver the bitumen 8p to the production tubing 12t via a discharge head. Alternatively, the pump 24 may be a positive displacement pump, such as a gear pump, vane pump, or progressive cavity pump.

An inlet 23 of the pump 24 may include a plurality of ports formed through the pump housing for allowing bitumen 8p to enter a lower or first stage of the pump and a screen to filter particulates from the production fluid. Alternatively, the inlet 23 may be a separate component, such as a bottom feeder having a housing and ported mandrel rotatable relative thereto and eccentrically weighted such that the mandrel ports orient in response to gravity to face a bottom side of the horizontal portion of the production wellbore 3p. Alternatively, the inlet 23 may be a separate component, such as a static gas separator or rotary gas separator depending on the gas content of the bitumen 8p.

The motor 20 may be an induction motor or a permanent magnet motor, such as a brushless DC motor (BLDC). The motor 20 may be filled with a dielectric, thermally conductive liquid lubricant, such as motor oil. The motor oil may have a density less than the bitumen 8p. In operation, the motor 20 may rotate the motor shaft, thereby driving the pump shaft. The induction motor may be a two-pole, three-phase, squirrel-cage type and have a wound stator. The BLDC motor may be two pole and three phase. The BLDC motor may include a stator having the three-phase winding and a permanent magnet rotor. The permanent magnet rotor may be made of one or more rare earth, ceramic, or ceramic-metal composite (aka cermet) magnets.

The motor driver 25s may provide power and control to the motor 20. The motor driver 25s may include a rectifier 26r, an inverter 26i, a programmable logic controller (PLC) 26c, and one or more sensors (not shown), such as a voltmeter and one or more ammeters. The motor driver 25s may receive a three-phase alternating current (AC) power signal from a utility grid or generator (not shown). The rectifier 26r may convert the three phase AC power signal to a direct current (DC) power signal and supply the converted DC power signal to the inverter 26i. For the induction motor, the inverter 26i may output a three-phase sinusoidal power signal at a variable frequency to control the speed of the motor 20.

For the BLDC motor, the inverter 26i may have an output for each phase (i.e., three) of the motor 20 and may modulate the DC power signal to drive each phase of the stator 10s based on control signals from the PLC 26c. The sensors may measure voltage and current of one or more of the inverter outputs and be in data communication with the PLC 26c. For the BLDC motor, the PLC 26c may execute a program for commissioning the motor 20 to obtain necessary parameters for model-based back electromotive force (BEMF) control of the motor. The PLC 26c may utilize data from the commissioning program to execute a BEMF model of the motor 20 for estimating a position of the rotor. The PLC 26c may use the estimated rotor position to control the inverter 26i such that the frequency of the power signals supplied to the stator windings match the frequency of the rotation of the magnetic field in the rotor. The PLC 26c may iteratively repeat the estimating and control in real time.

A surface cable may connect from the motor driver 25s to the production wellhead 2p. The surface cable may connect to a penetrator at the wellhead 2p. The penetrator may connect the surface cable to a downhole cable 14c. The downhole cable 14c may extend down a length of the production tubing 12t and may be fastened to the production tubing 12t at various intervals. The downhole cable 14c may terminate at a splice 14j. The splice 14j may connect the downhole cable 14c to a motor lead extension (MLE) cable 14f. The MLE cable 14f may be flat to fit in an annulus formed between the pump 24 and the casing 10 and/or liner 13. The MLE cable 14f may terminate at a pothead of the motor head 21. The pothead may be a connector assembly configured to connect the MLE cable 14f to internal leads (not shown) connected to stator windings of the motor 20. Each cable 14c,f may include a conductor for each phase of the motor (e.g., three), one or more insulating layers for each conductor, and an armor.

Figure 2:
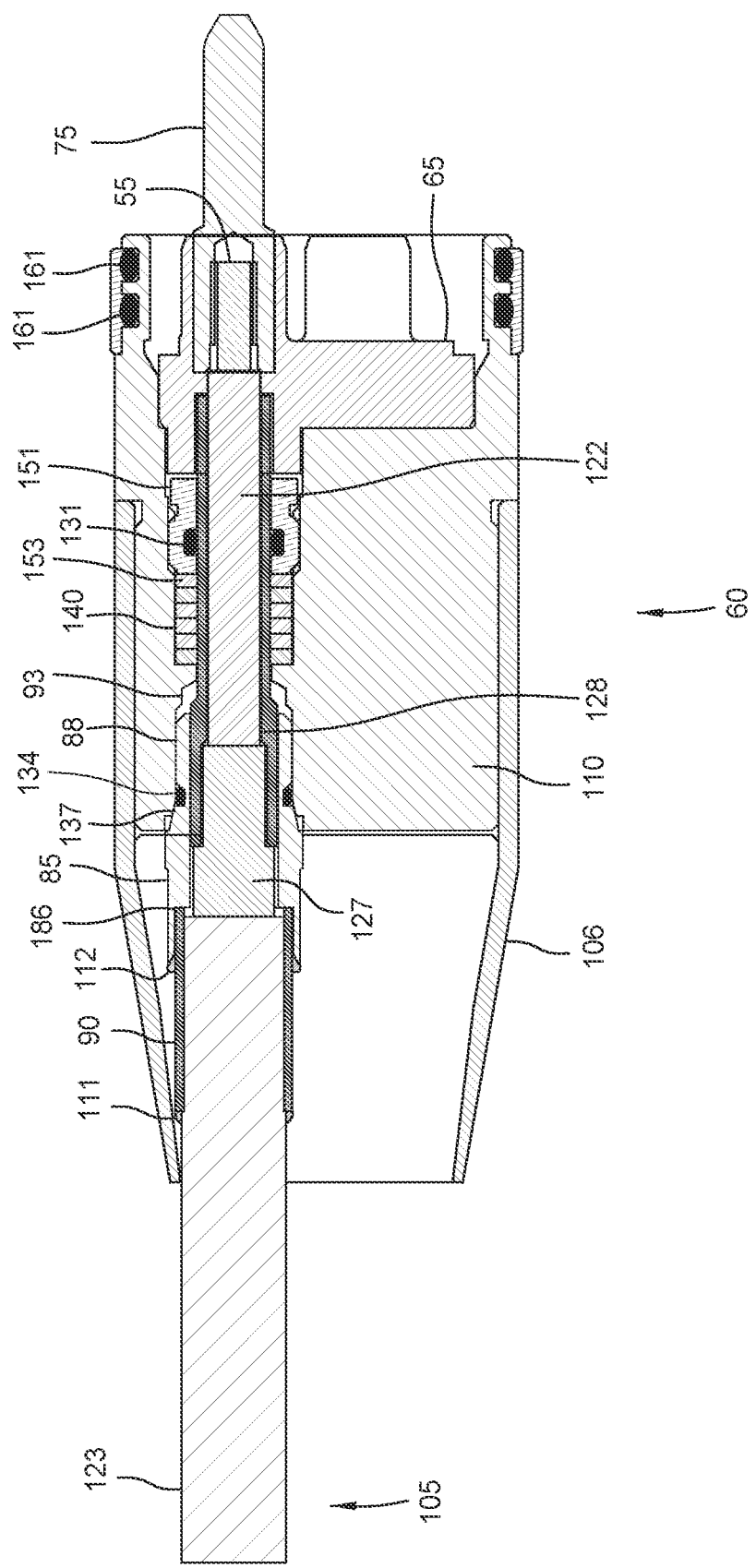
FIG. 2 illustrates an exemplary cable connected to a pothead.

In one embodiment, a cable 105 is coupled to a body 110 of a pothead 60, as shown in FIG. 2. The cable 105 is suitable for use as a MLE cable such as cable 14f. The pothead 60 is configured to connect the cable 105 to a motor head 21. The cable 105 includes a plurality of conductors, such as three conductors 55, for carrying three phase power. The body 110 of the pothead 60 includes three bores 93 for receiving each of the three conductors 55. For sake of clarity, FIG. 2 shows only one of the conductors 55 disposed in its respective bore 93 of the body 110. Each conductor 55 is made of copper.

One or more insulation layers capable of withstanding high temperatures are disposed around the conductors 55. In one embodiment, a first insulation layer 122 made of polyimide is disposed around the conductor 55. An exemplary polyimide layer is a layer of Kapton™, which is manufactured by DuPont. A second insulation is provided by extruding a fluoropolymer resin layer 127 around the polyimide insulation layer 122. An exemplary fluoropolymer resin layer is an epitaxial co-crystallized alloy fluoroplastic resin layer, available from Chemours Company.

A thermoplastic insulator tube 128 is disposed around an end of the second insulation layer 127 and the first insulation layer 122. The insulator tube 128 may be made from a thermoplastic material capable of withstanding the high temperature environment. In one example, the thermoplastic material for the insulator tube 128 has a hardness (Rockwell A) range between 25 and 40 in accordance with ASTM D-785. In one example, the insulator tube 128 is made from an extruded glass-reinforced polybenzimidazole-polyetheretherketone ("PBI-PEEK") blend material, such as Celazole®. In one embodiment, the end of the second insulation layer 127 is recessed to receive the insulator tube 128. For example, the insulator tube 128 may be threaded onto the second insulation layer 127. In one embodiment, the insulator tube 128 is bonded to the second insulation layer 127 and the first insulation layer 122. In another example, prior to bonding, the surface of the fluoropolymer containing second insulation layer 127 is treated by a sodium-based solvent to extract the fluorine atoms at the surface of the second insulation layer 127. An exemplary sodium-based solvent is an etch solvent containing sodium naphthalide in glycol ether. In one example, the insulator tube 128 is bonded to the insulation layers 122, 127 using a suitable epoxy, such as a cyclo-aliphatic two-part epoxy.

A metallic jacket 123 is disposed around the second insulation layer 127. The metallic jacket 123 may be made from metals such as stainless steel, lead, or other suitable metals. An armor can be disposed around the metallic jacket 123 and the plurality of conductors 55. In one embodiment, the armor is a metallic armor, and it may be applied as, for example, a helically wrapped metallic armor. In one example, the conductors 55 are arranged in a triangular configuration, although other suitable configurations are contemplated, such as a flat configuration.

The metallic jacket 123 is arranged such that a portion of the second insulation layer 127 extends out from the end of the metallic jacket 123. The insulator tube 128 attaches to the portion extending out of the metallic jacket 123. A metallic connector tube 90 is attached to the end of the metallic jacket 123. The connector tube 90 may be made from a metallic alloy and attached to the metallic jacket 123 using solder, thereby forming a seal 111 between the connector tube 90 and the metallic jacket 123. Suitable metallic alloys for the connector tube 90 include a nickel-copper alloy such as Monel™. In one embodiment, the connector tube 90 has a length between about 0.5 in. and about 5 ft.; preferably between about 0.5 in. and about 1 ft. In another example, the connector tube 90 has a length between 1 ft. and 4 ft.

A metal fitting 85 is attached to a bore 93 of the body 110 using threads 88. In one embodiment, the metal fitting 85 is configured to form a metal-to-metal seal 137 with the body 110. In one embodiment, the metal fitting 85 includes a tapered surface for mating with a tapered surface of the body 110. An optional secondary seal may be provided by disposing a back-up O-ring 134 between the metal fitting 85 and the body 110 and inwardly from the metal seal 137. The fitting 85 includes a bore 186 for receiving the conductor 55. FIG. 2 shows the exposed portion of the insulation layer 122 and the connector tube 90 are at least partially inserted into the bore 186 of the metal fitting 85. Solder is used to attach the connector tube 90 to the metal fitting 85, thereby forming a seal 112. In this embodiment, a portion of the insulator tube 128 is disposed inside the metal fitting 85.

A graphite containing sealing member 140 is employed to seal between the body 110 and the conductors 55. As shown in FIG. 2, the graphite containing sealing member 140 is disposed in the bore 93 of the body 110 and between the body 110 and the insulator tube 128. In one example, the graphite containing sealing member 140 is in the shape of a ring. In one embodiment, the graphite containing sealing member 140 comprises flexible graphite. The flexible graphite optionally includes a metal wire embedded in the flexible graphite ring. The rings may be formed from a sheet of flexible graphite. A plurality of rings are disposed next to each other, and the insulator tube 128 is disposed through the hole of the rings. For example, a plurality of rings, such as two, three, four, five, six, seven, or more, may be stacked next to each other. One or more of the plurality of rings may include an embedded metal wire. In one example, the ring stack may alternate between a ring with metal wire and a ring without a metal wire. In another example, the rings at each end include the metal wire, and the interior rings do not. In yet another example, the interior rings include the metal wire, and the end rings do not.

A fastener 151 is used to compress and retain the plurality of graphite containing sealing members 140 in the bore 93. The fastener 151 made be made of a corrosion resistant alloy such as a nickel-based alloy (e.g., Monel®) or an iron-based alloy. The sealing members 140 may be compressed against a restriction in the bore 93. In one embodiment, an optional washer 153 made of metal is disposed between the sealing members 140 and the fastener 151. The fastener 151 compresses the sealing members 140 sufficiently to form the desired seal with the body 110 and the insulator tube 128. In one example, the sealing members 140 are compressed between 10% and 40% of sealing members' 140 thickness. In one embodiment, an elastomeric sealing member 131 is disposed between the fastener 151 and the insulator tube 128. In one example, the sealing member 131 is an O-ring made of an elastomer such as a perfluoroelastomer. An epoxy may be used to seal the threaded connection between the fastener 151 and the body 110. An exemplary epoxy is a cyclo-aliphatic two-part epoxy. The epoxy may prevent leakage of the graphite particles and loosening of the threaded connection.

A male terminal 75 is attached to the end of the conductors 55. The terminal 75 may be made of brass and connected directly to the conductor 55 using a threaded connection. The terminal 75 is configured to transfer power from the cable 105 to the motor 20.

An insulator cap 65 is disposed around the three male terminals 75, a portion of the conductors 55, and a portion of the insulator tube 128. The insulator cap 65 may be made of a hard plastic having a hardness (Rockwell A) range between 25 and 40 in accordance with ASTM D-785. In one embodiment, the insulator cap 65 and the insulator tube 128 are made of the same material. The insulator cap 65 is configured to insulate the terminals 75 from the body 110. The interior end of the insulator cap 65 is disposed inside the bore 93 and between the body 110 and the insulator tube 128. The insulator cap 65 includes three openings for receiving each of the three conductors 55. An optional snap ring is used to retain the insulator cap 65 in position. In this respect, the position of the insulator cap 65 is fixed between the body 110 and the snap ring.

An end cap 106 is attached to the body 110 and extends over at least a portion of the connector tubes 90. The space in the end cap 106 may be filled with an epoxy. The epoxy may help stabilize the conductors 55 against movement at their connection with the body 110.

To connect the cable 105, the body 110 is attached to the motor head 21. Two sealing members 161 are disposed in a groove 67 of the body 110 and are engageable with the motor head 21. An exemplary sealing member 161 is an elastomeric O-ring such as perfluoroelastomer or EPDM. The sealing members 161 close off fluid communication between the body 110 of the pothead 60 and the motor head 21.

A cable system for use downhole includes a connector assembly having a body and a bore formed therethrough; a conductor disposed through the bore of the connector assembly; a first insulation layer disposed around the conductor; an insulator tube disposed around the conductor and having an end attached to the first insulation layer, the insulator tube comprising a thermoplastic material; and a graphite containing sealing member disposed in the bore and disposed between the insulator tube and the body of the connector assembly.

In one or more of the embodiments described herein, the cable system also includes a fastener configured to apply a compressive force against the graphite containing sealing member.

In one or more of the embodiments described herein, the cable system also includes an elastomeric sealing member disposed between the fastener and the insulator tube.

In one or more of the embodiments described herein, the cable system also includes a metal fitting attached to a bore surface of the body, the metal fitting forming a metal-to-metal seal with the body.

In one or more of the embodiments described herein, the cable system also includes an elastomeric sealing member disposed between the fitting and the body.

In one or more of the embodiments described herein, the cable system also includes a connector tube disposed around the first insulation layer, wherein the connector tube is sealingly attached to the fitting.

In one or more of the embodiments described herein, the cable system also includes a metal jacket disposed between the first insulation layer and the connector tube, wherein the connector tube is sealingly attached to the metal jacket.

In one or more of the embodiments described herein, the cable system also includes a second insulation layer disposed between the first insulation layer and the conductor.

In another embodiment, a submersible pumping system for use downhole includes a motor; a pump powered by the motor; a tubing connected to the pump; and a cable disposed along the tubing and configured to provide power to the motor. In one embodiment, the cable includes a connector assembly having a body and a bore formed therethrough; a conductor disposed through the bore of the connector assembly; a first insulation layer disposed around the conductor; an insulator tube disposed around the conductor and having an end attached to the first insulation layer, the insulator tube comprising a thermoplastic material; and a graphite containing sealing member disposed in the bore and disposed between the insulator tube and the body of the connector assembly.

In one or more of the embodiments described herein, the pumping system also includes a fastener configured to apply a compressive force against the graphite containing sealing member.

In one or more of the embodiments described herein, the pumping system also includes a metal fitting attached to a bore surface of the body, the metal fitting forming a metal-to-metal seal with the body.

In one or more of the embodiments described herein, the pumping system also includes a connector tube disposed around the first insulation layer, wherein the connector tube is sealingly attached to the fitting.

In one or more of the embodiments described herein, the pumping system also includes a metal jacket disposed between the first insulation layer and the connector tube, wherein the connector tube is sealingly attached to the metal jacket.

In one or more of the embodiments described herein, the connector tube has a length between 0.5 in. to 5 ft.

In one or more of the embodiments described herein, a plurality of graphite containing sealing members are stacked next to each other.

In one or more of the embodiments described herein, at least one of the graphite containing sealing members include a metal wire.

In one or more of the embodiments described herein, the plurality of graphite containing sealing member have a ring shape.

In one or more of the embodiments described herein, the first insulation layer is treated by an etch solvent before the insulator tube is attached to the first insulation layer.

While the foregoing is directed to certain aspects of the present disclosure, other and further aspects may be devised without departing from the basic scope thereof, and the scope thereof is determined by the claims that follow.

What is claimed as the invention is:

1. A cable system for use downhole, comprising:
   a connector assembly having a body and a bore formed therethrough;
   a conductor having a portion disposed in the bore of the connector assembly;
   an insulator cap having a cap portion, wherein the cap portion is disposed in the bore and disposed around a portion of the conductor;
   a graphite containing sealing member disposed in the bore and disposed between the portion of the conductor disposed in the bore and the body of the connector assembly; and
   a fastener pressing against the graphite sealing member and disposed between the cap portion and the graphite containing sealing member, wherein the fastener has a threaded connection to the body to retain the graphite containing sealing member in the bore.

2. The cable system of claim 1, wherein the fastener is configured to apply a compressive force against the graphite containing sealing member.

3. The cable system of claim 1, further comprising a metal fitting attached to a bore surface of the body, the metal fitting forming a metal-to-metal seal with the body.

4. The cable system of claim 3, further comprising an elastomeric sealing member disposed between the fitting and the body.

5. The cable system of claim 1, wherein a plurality of graphite containing sealing members are stacked next to each other.

6. The cable system of claim 5, wherein the plurality of graphite containing sealing members have a ring shape.

7. The cable system of claim 1, wherein the fastener is in contact with the graphite containing sealing member.

8. The cable system of claim 1, further comprising an insulator tube having a portion disposed around the portion of the conductor disposed in the bore of the connector assembly.

9. The cable system of claim 8, wherein the graphite containing sealing member is disposed between a portion of the insulator tube and the body of the connector assembly.

10. A submersible pumping system for use downhole, comprising:
    a motor;
    a pump powered by the motor;
    a tubing connected to the pump; and
    a cable disposed along the tubing and configured to provide power to the motor, the cable comprising:
      a connector assembly having a body and a bore formed therethrough;
      a conductor having a portion disposed in the bore of the connector assembly;
      an insulator cap having a cap portion, wherein the cap portion is disposed in the bore and disposed around a portion of the conductor;
      a graphite containing sealing member disposed in the bore and disposed between the portion of the conductor disposed in the bore and the body of the connector assembly; and
      a fastener pressing against the graphite containing sealing member and disposed between the cap portion and the graphite containing sealing member, wherein the fastener has a threaded connection to the body to retain the graphite containing sealing member in the bore.

11. The submersible pumping system of claim 10, wherein the fastener is configured to apply a compressive force against the graphite containing sealing member.

12. The submersible pumping system of claim 10, further comprising a metal fitting attached to a bore surface of the body, the metal fitting forming a metal-to-metal seal with the body.

13. The submersible pumping system of claim 10, wherein a plurality of graphite containing sealing members are stacked next to each other.

14. The submersible pumping system of claim 13, wherein at least one of the graphite containing sealing members includes a metal wire.

15. The submersible pumping system of claim 13, wherein the plurality of graphite containing sealing members have a ring shape.

16. The submersible pumping system of claim 10, further comprising a first insulation layer disposed around the portion of the conductor disposed in the bore of the connector assembly.

17. The submersible pumping system of claim 10, wherein the fastener is in contact with the graphite containing sealing member.

18. A cable system for use downhole, comprising:
    a connector assembly having a body and a bore formed therethrough;
    a restriction extending from the body of the connector assembly and disposed in the bore of the connector assembly;
    a conductor having a portion disposed in the bore of the connector assembly;
    an insulator cap having a cap portion, wherein the cap portion is disposed in the bore and disposed around a portion of the conductor;
    a graphite containing sealing member disposed in the bore of the connector assembly and disposed between the portion of the conductor disposed in the bore and the body of the connector assembly; and
    a fastener pressing against the graphite containing sealing member and disposed between the cap portion and the graphite containing sealing member, wherein the fastener has a threaded connection to the body to retain the graphite containing sealing member pressed against the restriction.

19. The cable system of claim 18, wherein the fastener is in contact with the graphite containing sealing member.

20. The cable system of claim 18, further comprising an insulator tube having a portion disposed around the portion of the conductor disposed in the bore of the connector assembly.

21. The cable system of claim 20, wherein the graphite containing sealing member is disposed between a portion of the insulator tube and the body of the connector assembly.

* * * * *